(12) United States Patent
Iwasaki et al.

(10) Patent No.: US 12,295,052 B2
(45) Date of Patent: May 6, 2025

(54) COMMUNICATION DEVICE, METHOD FOR SPECIFYING MOVING DISTANCE CORRELATION VALUE, AND STORAGE MEDIUM

(71) Applicant: CASIO COMPUTER CO., LTD., Tokyo (JP)

(72) Inventors: Yuki Iwasaki, Tachikawa (JP); Hiroyoshi Ogawa, Koganei (JP); Takako Ono, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 567 days.

(21) Appl. No.: 17/672,082

(22) Filed: Feb. 15, 2022

(65) Prior Publication Data

US 2022/0272782 A1    Aug. 25, 2022

(30) Foreign Application Priority Data

Feb. 22, 2021   (JP) ................................ 2021-026074

(51) Int. Cl.
　　*H04W 76/15*　　(2018.01)
　　*H04W 4/02*　　(2018.01)
　　*H04W 4/38*　　(2018.01)
　　*H04W 76/14*　　(2018.01)

(52) U.S. Cl.
　　CPC .......... *H04W 76/15* (2018.02); *H04W 4/027* (2013.01); *H04W 4/38* (2018.02); *H04W 76/14* (2018.02)

(58) Field of Classification Search
　　CPC ..................................................... H04W 76/15
　　See application file for complete search history.

(56) References Cited

U.S. PATENT DOCUMENTS

| 11,153,431 | B2 * | 10/2021 | Kim | ................. | H04M 1/72412 |
| 2008/0243388 | A1 * | 10/2008 | Eguchi | ................. | G05D 1/027 |
|  |  |  |  |  | 701/301 |
| 2014/0155031 | A1 * | 6/2014 | Lee | ................. | G06F 21/35 |
|  |  |  |  |  | 455/411 |

(Continued)

FOREIGN PATENT DOCUMENTS

JP           2003-125436 A      4/2003

*Primary Examiner* — Guang W Li
(74) *Attorney, Agent, or Firm* — Scully, Scott, Murphy & Presser, P.C.

(57) ABSTRACT

Provided is a communication device that includes a wireless communication receiver that performs, with an external device, a first wireless communication for acquiring first information concerning a moving distance of the communication device and a second wireless communication that possibly has collision with the first wireless communication, and a processor that specifies a moving distance correlation value related to the moving distance. The processor acquires an acceleration of the communication device, specifies the moving distance correlation value based on the first information that the wireless communication receiver acquires from the external device, and specifies the moving distance correlation value based on the acceleration of the communication device in a case determining that a first condition is present. In the first condition, acquisition of the first information from the external device is possibly interrupted by the collision more than predetermined.

20 Claims, 5 Drawing Sheets

(56) References Cited

U.S. PATENT DOCUMENTS

| | | | |
|---|---|---|---|
| 2015/0031333 A1* | 1/2015 | Lee | G06F 1/1698 |
| | | | 455/411 |
| 2016/0105923 A1* | 4/2016 | Chen | H04W 76/14 |
| | | | 455/41.2 |
| 2016/0277891 A1* | 9/2016 | Dvortsov | H04W 4/12 |
| 2020/0149921 A1* | 5/2020 | Hoffman | G01S 19/19 |

* cited by examiner

|   | ACQUISITION OF GPS DISTANCE | MEASUREMENT OF ACCELERATION SENSOR DISTANCE |
|---|---|---|
| A | START | START (RETAIN) |
| B | STOP | START REFLECTING |
| C | RESTART | STOP REFLECTING |
| D | STOP | STOP AND RESET |

200]
COMMUNICATION DEVICE, METHOD FOR SPECIFYING MOVING DISTANCE CORRELATION VALUE, AND STORAGE MEDIUM

CROSS-REFERENCE TO RELATED APPLICATIONS

This application is based upon and claims the benefit of priority under 35 U.S.C. 119 of Japanese Patent Application No. 2021-026074 filed on Feb. 22, 2021, the entire disclosure of which, including the description, claims, drawings, and abstract, is incorporated herein by reference in its entirety.

BACKGROUND

Technical Field

The present disclosure relates to a communication device, a method for specifying a moving distance correlation value, and a storage medium.

Description of the Related Art

Conventionally, there have been known communication devices that specify their own positions by performing wireless communications with external devices that possess positional information and acquiring the positional information from the external devices (ex., JP 2003-125436 A). Such a communication device can specify moving distance correlation values (ex., moving distance, average pace, etc., hereinafter referred to as distance information) of its own in real-time by continuously acquiring information concerning a moving distance from the external device that moves with the communication device.

SUMMARY

A communication device according to one aspect of the present disclosure includes:
  a wireless communication receiver that performs, with an external device, a first wireless communication for acquiring first information concerning a moving distance of the communication device and a second wireless communication that possibly has collision with the first wireless communication; and
  a processor that specifies a moving distance correlation value related to the moving distance,
  wherein the processor:
    acquires an acceleration of the communication device;
    specifies the moving distance correlation value based on the first information that the wireless communication receiver acquires from the external device; and
    specifies the moving distance correlation value based on the acceleration of the communication device in a case determining that a first condition is present, wherein in the first condition, acquisition of the first information from the external device is possibly interrupted by the collision more than predetermined.

DESCRIPTION OF THE EMBODIMENT

Hereinafter, one or more embodiments of a communication device, a method for specifying a moving distance correlation value, a storage medium are described with reference to the drawings.

(Configuration of Communication System)

Figure 1:
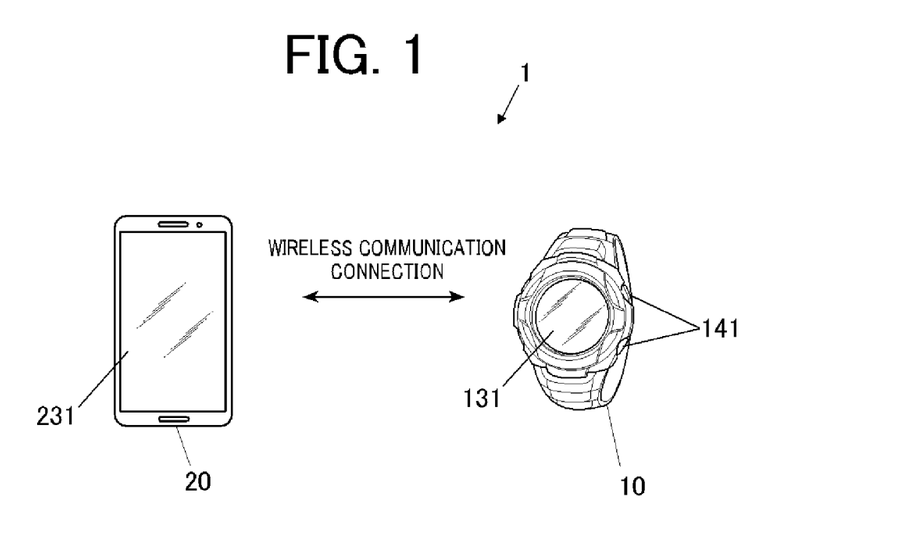
FIG. 1 shows an overall configuration of a communication system.

FIG. 1 shows an overall configuration of a communication system 1 of this embodiment.

The communication system 1 includes an electronic timepiece 10 (communication device), and a smartphone 20 (external device).

The electronic timepiece 10 is carried around by a user to be used, and may be an electronic watch, for example. The electronic timepiece 10 includes a display screen 131 and operation buttons 141. The display screen 131 performs digital display in a form of dot matrix. The electronic timepiece 10 displays basic information such as time and date, an elapsed time measured in a stopwatch mode, a moving distance, and the like on the display screen 131.

The smartphone 20 is a terminal device with a call function and a data communication function and is mainly carried around by a user to be used. The smartphone 20 can perform short-distance wireless communications using Bluetooth (registered trademark) with the electronic timepiece 10. In this embodiment, Bluetooth Low Energy (BLE) is used as Bluetooth communication, but the present disclosure is not limited to this example. Alternatively, a short-distance wireless communication means other than Bluetooth may be used. Hereinafter, the communication connection between the electronic timepiece 10 and the smartphone 20 via short-distance wireless communications is referred to as pairing. The smartphone 20 in this embodiment performs various kinds of linked operations by transmitting and receiving data to and from the paired electronic timepiece 10 and displays information concerning the linked operations on a display screen 231. The smartphone 20 can receive radio waves transmitted from a positioning satellite of GPS (Global Positioning System) and calculate the current location and the date and time.

(Configuration of Electronic Timepiece)

Figure 2:
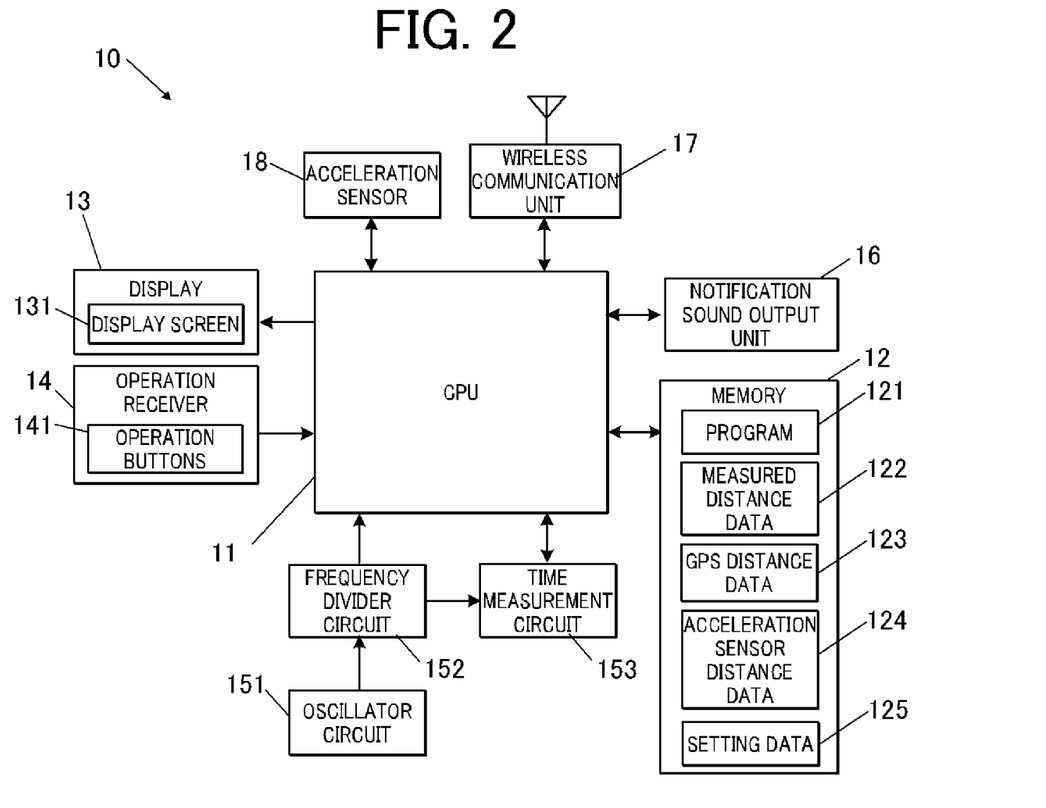
FIG. 2 is a block diagram showing a functional configuration of an electronic timepiece.

FIG. 2 is a block diagram showing a functional configuration of the electronic timepiece 10.

The electronic timepiece 10 includes a CPU 11 (central processing unit), a memory 12 (a non-transitory computer-readable storage medium), a display 13, an operation receiver 14, an oscillator circuit 151, a frequency divider circuit 152, a time measurement circuit 153 (time measurer), a notification sound output unit 16, a wireless communication unit 17, (wireless communication receiver) and an acceleration sensor 18.

The CPU 11 is a processor that performs various kinds of arithmetic processing and centrally controls the operations of the components of the electronic timepiece 10. The CPU 11 functions as a controller that performs various kinds of control operations by reading a program(s) 121 stored in the memory 12 and executing the programs.

For example, the CPU 11 specifies a moving distance correlation value(s) concerning the moving distance of the electronic timepiece. The details of the moving distance correlation value and measurement method are described later.

The CPU 11 switches operation modes of the electronic timepiece 10 according to commands from the user. The switching of the operation modes is described later.

The CPU 11 modifies the date and time measured by the time measurement circuit 153 based on the date-and-time information acquired from the smartphone 20.

The memory 12 provides the CPU 11 with a memory space for work, and stores various data. The memory 12 includes, for example, a RAM (random access memory) and a non-volatile memory. The RAM is used for the arithmetic processing of the CPU 11 and stores temporary data. The non-volatile memory is a flash memory, for example, and stores the programs 121 and various kinds of data. The data stored in the memory 12 includes measured distance data 122, GPS distance data 123, acceleration sensor distance data 124, and setting data 125.

The measured distance data 122 is data indicating a moving distance and an average pace of the electronic timepiece 10 at each point in time which are calculated and specified in the stopwatch mode described later. The moving distance and the average pace included in the measured distance data 122 are examples of a "moving distance correlation value."

The GPS distance data 123 is transmitted from the smartphone 20 via wireless communications, acquired by the wireless communication unit 17, and stored in the memory 12. The GPS distance data 123 includes information on a moving distance calculated from the GPS positional information in the smartphone 20. The moving distance indicating the GPS distance data 123 is referred to as a "GPS distance." The GPS distance is an example of "first information" that the electronic timepiece 10 acquires from the smartphone 20. The GPS distance is used to calculate the moving distance and the average pace of the electronic timepiece 10. In other words, the GPS distance is used to generate or update the measured distance data.

The acceleration sensor distance data 124 includes information on the moving distance of the electronic timepiece 10 specified based on the result of detection by the acceleration sensor 18. Hereinafter, the moving distance indicated by the acceleration sensor distance data 124 is referred to as an "acceleration sensor distance." The acceleration sensor distance is used to calculate the moving distance and the average pace of the electronic timepiece 10. In other words, the acceleration sensor distance is used to generate or update the measured distance data 122.

The setting data 125 is data concerning various operation settings of the electronic timepiece 10. The setting data 125 is generated or uploaded according to user operations on the operation buttons 141 or setting command data transmitted from the smartphone 20.

The display 13 includes a display screen 131 and performs digital display on the display screen 131 under the control of the CPU 11. Here, the display screen 131 performs display in a form of dot matrix, and may be a liquid crystal display screen, for example.

The operation receiver 14 includes multiple operation buttons 141. The operation receiver 14 receives user input operations on the operation buttons 141 (ex., pressing operation) and outputs corresponding input signals to the CPU 11. The CPU 11 executes the processing corresponding to the function assigned to the operation button 141 on which the input operation is performed. The functions assigned to the operation buttons 141 may be switched according to the operation modes of the electronic timepiece 10. The operation buttons 141 may include a crown. The operation receiver 14 includes a touch panel overlaid on the display screen 131.

The oscillator circuit 151 generates a clock signal of a predetermined oscillation frequency and outputs the clock signal to the frequency divider circuit 152. The frequency divider circuit 152 divides the clock signal input from the oscillator circuit 151, thereby converting the clock signal into a signal of a frequency that is necessary for each component of the electronic timepiece 10 to operate, and outputs the signal. The destination of the signal generated by the frequency divider circuit 152 includes the time measurement circuit 153.

The time measurement circuit 153 counts the signals of the frequency input from the frequency divider circuit 152 to calculate and keep the current date and time. The format of the current date and time kept by the time measurement circuit 153 is not limited to the year, month, date, hour, minute and second format, and may be any format as far as it is suitable for processes performed by the CPU 11 or the like. As described above, the date and time counted by time measurement circuit 153 is modified by the CPU 11.

The notification sound output unit 16 outputs a notification sound such as a beep according to the control signal from the CPU 11.

The wireless communication unit 17 transmits and receives data to and from the external device(s) by wireless communications, that is, using radio waves. In this embodiment, the wireless communication unit 17 performs shot-range wireless communications via BLE with the smartphone 20 to be paired.

The acceleration sensor 18 detects an acceleration of the electronic timepiece 10 produced along with the user's movement and outputs the detection result to the CPU 11. The number of steps of the user while walking can be specified from the result of detection by the acceleration sensor 18.

(Configuration of Smartphone)

Figure 3:
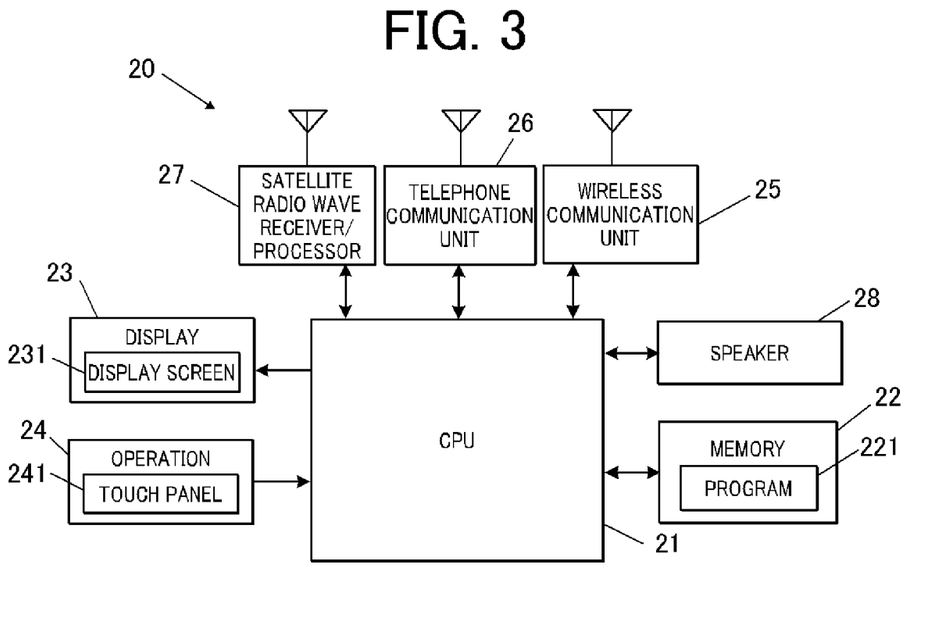
FIG. 3 is a block diagram showing a functional configuration of a smartphone.

FIG. 3 is a block diagram showing a functional configuration of the smartphone 20.

The smartphone 20 includes a CPU 21, a memory 22, a display 23, an operation receiver 24, a wireless communication unit 25, a telephone communication unit 26, a satellite radio wave receiver/processor 27, and a speaker 28.

The CPU 21 is a processor that performs various kinds of arithmetic processing and centrally controls the operations of the components of the smartphone 20. The CPU 21 reads and executes a program(s) 221 stored in the memory 22, thereby performing various kinds of control operations. The CPU 21 calculates a moving distance (GPS distance) based on transitions of the current locations calculated by the satellite radio wave receiver/processor 27, and transmits the GPS distance data 123 including the information on the GPS distance to the electronic timepiece 10. The CPU 21 modifies the system date and time of the smartphone 20 based on the date and time calculated by the satellite radio wave receiver/processor 27.

The memory 22 provides the CPU 21 with a memory space for work, and stores various data. The memory 22 includes a RAM and a non-volatile memory, for example. The RAM is used by the CPU 21 to perform the arithmetic processing, and stores temporary data. The non-volatile memory is a flash memory, for example, and stores various kinds of data as well as the programs 221. The programs 221 include an OS and various kinds of application programs (hereinafter also referred to as an "app"). A timepiece linkage application for linked operations with the electronic timepiece 10 is installed in the smartphone 20 in this embodiment. The smartphone 20 running the timepiece linkage application receives the operation setting of the electronic timepiece 10, transmits the above-described setting command data to the electronic timepiece 10, and transmits various kinds of notifications of incoming calls, mail receptions, and alarms to the electronic timepiece 10, for example.

The display 23 includes a display screen 231 and performs digital display on the display screen 231 based on the control of the CPU 21. Here, the display screen 231 performs display in a form of dot matrix, and may be a liquid crystal display screen, for example.

The operation receiver 24 receives user input operations and outputs corresponding input signals to the CPU 21. The operation receiver 24 includes a touch panel 241 overlaid on the display screen 231, and detects a touch of a user or the like as an input operation via the touch panel 241. The operation receiver 24 may also include hardware buttons.

The wireless communication unit 25 performs short-distance wireless communications via the BLE with the electronic timepiece 10 to be paired. The wireless communication unit 25 performs data communications with an external server.

The telephone communication unit 26 communicates with mobile phone stations or the like to transmit and receive voice data of telephone communications, packet data relating to the Internet connection, etc.

The satellite radio wave receiver/processor 27 is a module that receives radio waves transmitted from a GPS satellite and calculates the current location and date and time based on the GPS data. The satellite radio wave receiver/processor 27 calculates the current location and date and time and outputs the results to the CPU 21 under the control of the CPU 21.

The speaker 28 outputs various kinds of sounds such as a notification sound according to the control signal from the CPU 21.

(Operations of Communication System)

Next, operations of the communication system 1 are described focusing on operations for specifying the moving distance correlation value in the electronic timepiece 10.

First, methods for specifying the moving distance correlation values by the CPU 11 are described. The CPU 11 specifies a moving distance correlation value(s) and reflects the specified result(s) in the measured distance data 122. The moving distance correlation value is a value related to the moving distance of the electronic timepiece 10, and may include various values that are correlated to the moving distance such as an average pace, in addition to a moving distance of the electronic timepiece 10 from a specific point, and the like. The moving distance needs to be specified for specifying any of the moving distance correlation values.

The CPU 11 of this embodiment can specify the moving distance in the following two methods.

One method (first method) is specifying the moving distance based on the GPS distance included in the GPS distance data 123 received from the smartphone 20. The GPS distance indicates the moving distance of the smartphone 20 in a period of time. Since the smartphone 20 is carried around by a used to be used with the electronic timepiece 10, the GPS distance can be used as the moving distance of the electronic timepiece 10 without being changed.

The GPS distance is calculated by the CPU 21 of the smartphone 20 based on the transition of the current locations calculated by the satellite radio wave receiver/processor 27 of the smartphone 20. The GPS distance data 123 including the GPS distance is continuously and repeatedly transmitted from the smartphone 20 to the electronic timepiece 10. Each piece of the GPS distance data 123 includes information of the moving distance of the smartphone 20 since transmission of the previous piece of the GPS distance data 123 is completed. In other words, the GPS distance calculated in the smartphone 20 is reset each time the GPS distance data 123 is transmitted. More specifically, the GPS distance is reset when the GPS distance data 123 is transmitted and the packet data of confirmation of reception of the GPS distance data 123 is received from the electronic timepiece 10 by the smartphone 20. In a case where the GPS distance data 123 is transmitted but the packet data of reception confirmation is not received, the concerning GPS distance data 123 is deemed not received by the electronic timepiece 10, and the GPS distance being calculated is not reset.

Each time the GPS distance data 123 is received, the GPS distance indicated by the received GPS distance data 123 is added to the moving distance indicated by the measured distance data 122 in the electronic timepiece 10. This makes it possible to acquire the measured distance data 122 indicating the accumulated moving distance of the electronic timepiece 10 since the start of measurement. Each time the moving distance is updated, the average pace is calculated and the data of the average pace in the measured distance data 122 is updated.

However, this method has a problem in updating. When reception of the GPS distance data 123 (acquisition of the GPS distance) is interrupted in the electronic timepiece 10, the moving distance cannot be updated while the reception is interrupted. One of the causes of interruption of the reception of the GPS distance data 123 is collision of wireless communications. For example, when data other than the GPS distance data 123 is transmitted from the smartphone 20 and its reception is being processed in the electronic timepiece 10, the GPS distance data 123 transmitted from the smartphone 20 cannot be received and the reception of the GPS distance data 123 fails. In that case, the wireless communications for receiving the GPS distance data 123 are "first wireless communications" and the wireless communications for receiving the other data (second information) are "second wireless communications" that collide with the first wireless communications.

The CPU 11 of the electronic timepiece 10 can also calculate the moving distance by another method (second method) in which the GPS distance data 123 is not used, and may switch between the first method and the second method according to the collision state of the wireless communications.

The second method is calculating the acceleration sensor distance based on the result of detection by the acceleration sensor 18 and specifying and updating the moving distance of the measured distance data 122 using the acceleration sensor distance. Specifically, the CPU 11 specifies the number of steps of the user from the detection results of the acceleration sensor 18, and calculates the acceleration sensor distance by multiplying the number of steps by a predetermined distance per step. The calculated acceleration sensor distance is recorded in the acceleration sensor distance data 124. As the acceleration sensor distance in the acceleration sensor distance data 124 is added to the measured distance data 122 at predetermined timings, the measured distance data 122 that indicates the accumulated moving distance of the electronic timepiece 10 can be acquired. The distance per step may be determined based on the data on the user's height or the like registered in the setting data 125. The movement state (ex., walking, running, etc.) of the user may be determined based on the detection results of the acceleration sensor 18 so that the distance per step is adjusted according to the determined movement state.

The second method has an advantage over the first method in that it is possible to specify the moving distance without using the GPS distance data 123, though the accuracy of specifying the moving distance is compensated in comparison to the first method. Therefore, it is possible to stably specify the moving distance at appropriate timings and update the measured distance data 122 by switching between the first method and the second method according to the collision state of the wireless communications.

Hereinafter, the control of switching between the first method and the second method is described. The outline of the control is as follows. The moving distance is usually specified by the first method using the GPS distance, but in the case where it is determined that there is a condition in which acquisition of the GPS distance from the smartphone 20 is interrupted more than predetermined (hereinafter referred to as a "first condition"), the first method is switched to the second method using the acceleration sensor distance. Here, being "interrupted more than predetermined" means that a predetermined time elapses without the GPS distance being acquired or that the electronic timepiece 10 moves by more than a predetermined distance without the GPS distance being acquired. The switching between the first method and the second method is performed simultaneously (linked) with switching of the operation modes of the electronic timepiece 10.

The electronic timepiece 10 operates in one of the operation modes specified by the user, and the operation modes are switched by user operations. The above-described operation modes include a time mode for displaying basic information such as date and time, day of the week, and the like, a stopwatch mode for measuring and displaying an elapsed time, a moving distance, and the like, a recall mode for calling data measured in the stopwatch mode, an alarm mode for setting alarms, a timer mode, and the like. The switching of the operation modes is described below with an example of switching between the time mode and the stopwatch mode.

Figure 4:
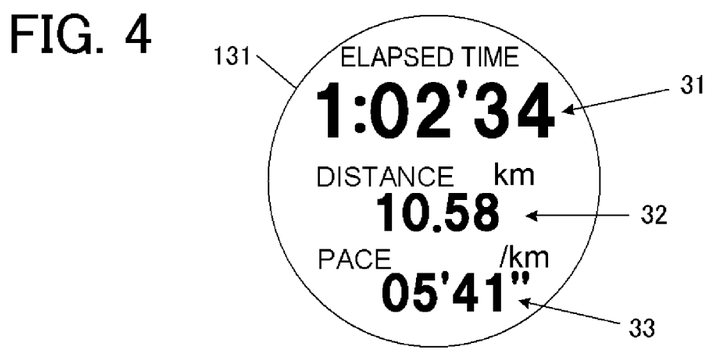
FIG. 4 shows an example of a display screen in a stopwatch mode.

FIG. 4 shows an example of a display screen 131 in the stopwatch mode.

In the stopwatch mode, when an operation button 141 to which a start/stop function is assigned is pressed, an elapsed time 31 since the timing of pressing is measured and a moving distance 32 and an average pace 33 of the electronic timepiece 10 since that timing are calculated and displayed on the display screen 131.

In the stopwatch mode, when an operation button 141 to which a mode-switching function is assigned is pressed, the operation mode is switched to the time mode while the elapsed time 31, the moving distance 32, and the average pace 33 are still being measured.

Figure 5:
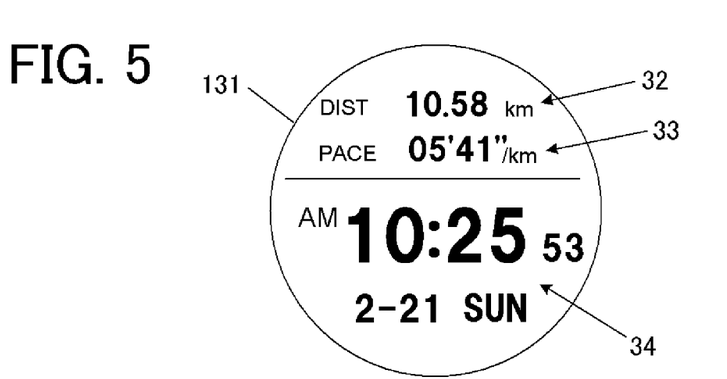
FIG. 5 shows an example of a display screen in a time mode.

FIG. 5 shows an example of the display screen 131 in the time mode.

On the display screen 131 of the time mode, the basic information 34 including time, date and day of the week. In the case where the moving distance 32 and the moving distance 33 are being measured, those items are additionally displayed in a smaller size. The elapsed time 31 may be displayed in addition to (or instead of) the moving distance 32 and the average pace 33.

In the time mode, various kinds of data are transmitted and received to and from the paired smartphone 20.

For example, the date-and-time information (the second information) is transmitted from the smartphone 20 so as to synchronize the date and time with the smartphone 20. The CPU 11 modifies the date and time measured by the time measurement circuit 153 based on that date-and-time information.

When an operation of setting modification of the electronic timepiece 10 in the timepiece linking application of the smartphone 20, the setting command data (second information) that commands the concerning setting modification is transmitted to the electronic timepiece 10. The CPU 11 modifies the content of the setting data 125 based on the setting command data and modifies the operation setting of the electronic timepiece 10.

The wireless communications for receiving the date-and-time data and the setting command data may be the second wireless communications that collide with the first wireless communications for receiving the GPS distance data 123. That is, in the time mode, when the GPS distance data 123 is transmitted from the smartphone 20 while the reception of the date-and-time data and the setting command data is being processed, the reception of the GPS distance data 123 may fail and the moving distance may not be updated, problematically. In other words, the time mode is the condition in which the acquisition of the GPS distance is interrupted more than predetermined (the first condition) due to collision of the wireless communications. Therefore, when the electronic timepiece 10 is operating in the time mode, the CPU 11 determines that the first condition is present and specifies the moving distance by the second method using the acceleration sensor distance.

In contrast, the stopwatch mode is mainly intended for measurement and display of the elapsed time 31, the moving distance 32, and the average pace 33, and basically does not involve wireless communications for transmitting and receiving data other than the GPS distance data 123 to and from the smartphone 20. Therefore, the CPU 11 determines that acquisition of the GPS distance is not interrupted more than predetermined due to collision of the wireless communications (that is, not the first condition), and specifies the moving distance by the first method.

In the stopwatch mode, the second wireless communications may be established for a specific purpose. For example, in the case where an auto-lap function is enabled, the second wireless communications may be established for a notification sound interconnection. Here, the auto-lap function is to record lap times automatically each time the moving distance of the electronic timepiece 10 increases by a predetermined lap distance. The notification sound interconnection is to output a notification sound on the smartphone 20 simultaneously with recording of lap times. For this notification sound interconnection, a request for outputting a notification sound is transmitted from the electronic timepiece 10 to the smartphone 20. The wireless communications for transmitting an output request for a notification sound are the second wireless communications that may collide with the first wireless communications for receiving the GPS distance data 123. However, if the frequency of the second wireless communications is equal to or below the upper limit of the frequency with which reception of the GPS distance data 123 is not interrupted (hereinafter referred to as a "reference frequency"), the moving distance may be calculated by the first method using the GPS distance. Here, the reference frequency may be once for each time the moving distance of the electronic timepiece 10 increases by a predetermined reference distance (ex., the above-described lap distance). In the case where the reference frequency is set as described, the stopwatch mode with the notification sound interconnection being set corresponds to the first operation mode in which the frequency of the second wireless communications is equal to or below the reference frequency. In contrast, the time mode corresponds to the second operation mode in which the frequency of the second wireless communications is greater than the reference frequency. In the case where the electronic timepiece 10 is operating in the first operation mode, the CPU 11 decides that the first condition is not present and specifies the moving distance by the first method using the GPS distance. In the case where the electronic timepiece 10 is operation in the second operation mode, the CPU 11 determines that the first condition is present, and specifies the moving distance by the second method using the detection result using the acceleration sensor 18.

The reference frequency is not limited to the above-described example, and may be "0," for example. That is, the operation mode in which the second wireless communications that may collide with the first wireless communications may be defined as the first operation mode and the operation mode other than this may be defined as the second operation mode. In this case, for example, the stopwatch mode without the above-described notification sound interconnection corresponds to the first operation mode.

In the above-described example, the methods for specifying the moving distance are switched simultaneously with switching of the operation modes, but additionally, the method may be switched to the second method using the acceleration sensor distance in the condition where acquisition of the GPS distance is interrupted more than predetermined (hereinafter referred to as the "second condition"). For example, regardless of the operation mode of the electronic timepiece 10, in the case where the GPS distance data 123 is not received for a predetermined time (ex., 30 seconds), the CPU 11 may determine that the second condition is present and switch the method to the second method. This makes it possible to stably continue specifying the moving distance using the acceleration sensor distance even in the case where acquisition of the GPS distance is interrupted due to a cause other than collision of the wireless communications. A cause other than collision of the wireless communications may be a failure of positioning by the smartphone 20, a malfunction of the short-distance wireless communications between the smartphone 20 and the electronic timepiece 10, or the like.

Next described is a moving distance specifying process performed for specifying the moving distance by the above-described method.

Figure 6:
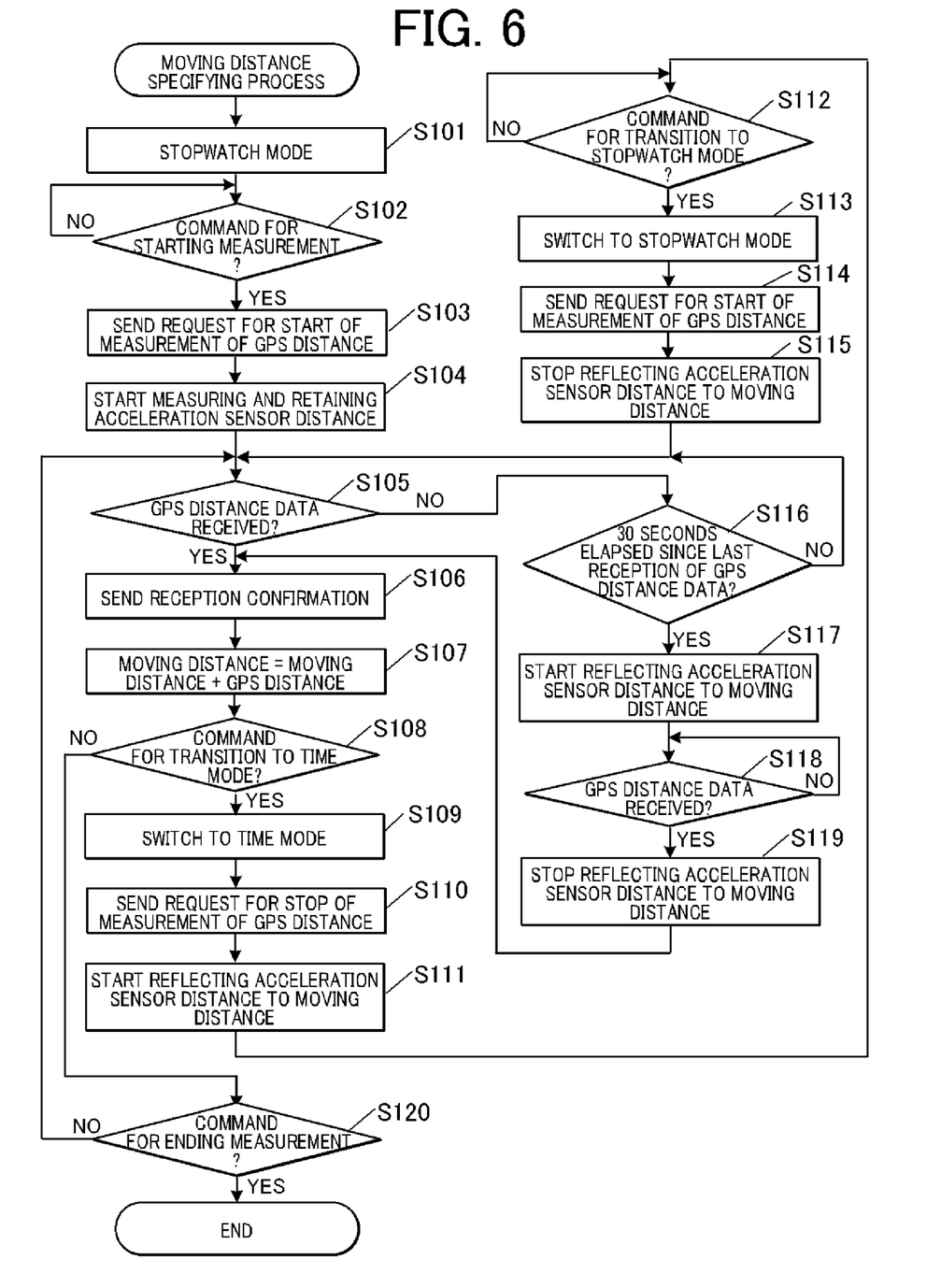
FIG. 6 is a flowchart showing control steps of a moving distance specifying process.

FIG. 6 is a flowchart showing control steps of the moving distance specifying process by the CPU 11.

The moving distance specifying process is started when the user gives a command for transition to the stopwatch mode.

When the moving distance specifying process is started, the CPU 11 switches the operation mode of the electronic timepiece 10 to the stopwatch mode (Step S101). Here, the CPU 11 causes the display 13 to perform the stopwatch mode display shown in FIG. 4. At the time of transition to the stopwatch mode, the elapsed time 31, the moving distance 32, and the average pace 33 are all "0," as a "reset state."

The CPU 11 determines whether a measurement start command is given, namely whether the operation button 141 to which the start/stop function (hereinafter referred to as the "start/stop button") is assigned is pressed (Step S102), and if the CPU 11 determines that the measurement start command is not given ("NO" at Step S102), Step S102 is repeated.

If the CPU 11 determines that the measurement start command is given ("YES" at Step S102), the CPU 11 transmits a request for starting measurement of the GPS distance to the smartphone 20 (Step S103). The smartphone 20, in response to reception of this request for starting measurement, starts positioning by the satellite radio wave receiver/processor 27 and calculation of the GPS distance using the positioning result, and transmits the GPS distance data 123 continuously and repeatedly as described above. The CPU 11 measures the elapsed time 31, the moving distance 32, and the average pace 33 since the timing of the command for starting measurement and causes those items to be displayed on the display screen 131. The display of the moving distance 32 and the average pace 33 is based on the measurement distance data 122. The state where the elapsed time 31, the moving distance 32, and the average pace 33 are measured is referred to as a "run state." Here, measurement of the moving distance by the first method using the GPS distance is started.

The CPU 11 starts measurement of the moving distance (acceleration sensor distance) based on the detection result by the acceleration sensor 18, and retains this acceleration sensor distance as the acceleration sensor distance data 124 (Step S104). At this stage, the acceleration sensor distance is not reflected in the measurement distance data 122.

The CPU 11 determines whether the distance data 123 is received from the smartphone 20 (Step S105), and if the CPU determines that the GPS distance data 123 is received ("YES" at Step S105), the CPU 11 transmits packet data for reception confirmation to the smartphone 20 (Step S106).

The CPU 11 adds the acquired GPS distance to the moving distance indicated by the measurement distance data 122 (Step S107). The CPU 11 calculates the average pace based on the moving distance to which the GPS distance is added and the elapsed time which is being measured, and updates data of the average pace included in the measurement distance data 122. The CPU 11 causes the latest moving distance 32 and average pace 33 to be displayed on the display screen 131.

The CPU 11 determines whether a command for transition to the time mode is given by the user (Step S108). If the CPU determines that the command for transition to the time mode is not given ("NO" at Step S108), the CPU 11 determines whether a command for ending measurement is given (Step S120). Here, the command for ending measurement is given by an action of pressing an operation button 141 to which a reset function is assigned (hereinafter referred to as the "reset button") while measurement is paused by pressing the start/stop button. If the CPU 11 determines that the command for ending measurement is not given ("NO" at Step S120), the CPU 11 returns the process to Step S105 and continues specifying the moving distance using the GPS distance.

If the CPU 11 determines that the command for transition to the time mode is given at Step S108 ("YES" at Step S108), the CPU 11 switches the operation mode of the electronic timepiece 10 to the time mode (Step S109). That is, the CPU 11 causes the display 13 to perform the time mode display shown in FIG. 5. Here, the moving distance 32 and the average pace 33 which are being measured are displayed with the basic information 34. When the operation mode is switched to the time mode, the CPU 11 determines that the first condition is present where acquisition of the GPS distance is interrupted more than predetermined, performs Steps S110 and S111 described below, and switches the method for specifying the moving distance from the first method to the second method.

The CPU 11 transmits a request for stopping measurement of the GPS distance (Step S110). The smartphone 20, in response to reception of this request for ending measurement, stops calculation of the GPS distance and transmission of the GPS distance data 123.

The CPU 11 starts reflecting the acceleration sensor distance to the moving distance (Step S111). That is, the CPU 11 adds the acceleration sensor distance being calculated instead of the GPS distance to the moving distance of the measurement distance data 122 and calculates the average pace as well, and causes the moving distance 32 and the average pace 33 to be displayed based on the measurement distance data 122.

The CPU 11 determines whether the command for transition to the stopwatch mode is given (Step S112). If the CPU determines that the command for transition to the stopwatch mode is not given ("NO" at Step S112), the CPU 11 performs Step S112 again.

If the CPU 11 determines that the command for transition to the stopwatch mode ("YES" at Step S112), the CPU 11 switches the operation mode of the electronic timepiece 10 to the stopwatch mode (Step S113). When the operation mode is switched to the stopwatch mode, the CPU 11 determines that the first condition is not present, performs Steps S114 and S115, and switches the method for specifying the moving distance from the second method to the first method. That is, the CPU 11 transmits the request for starting measurement of the GPS distance (Step S114). Step S114 is similar to Step S103. The CPU 11 stops reflecting the acceleration sensor distance to the moving distance and changes the value to be added to the measurement distance data 122 to the GPS distance (Step S115). After this, the CPU 11 moves the process to Step S105.

On contrary, if the CPU 11 determines that the GPS distance data 123 is not received at Step S105 ("NO" at Step S105), the CPU 11 determines whether 30 seconds (predetermined time) have elapsed since the last reception of the GPS distance data 123 (Step S116). If the CPU 11 determines that 30 seconds have not elapsed since the last reception ("NO" at Step S116), the CPU 11 returns the process to Step S105.

If the CPU 11 determines that 30 seconds have passed since the last reception of the GPS distance data 123 ("YES" at Step S116), the CPU 11 determines that the second condition is present where acquisition of the GPS distance is interrupted more than predetermined and starts reflecting the acceleration sensor distance to the moving distance (Step S117). Step S117 is similar to Step S111. At Step S117, the method of specifying the moving distance is switched from the first method to the second method.

The CPU 11 determines whether the GPS distance data 123 is received (Step S118), and if the CPU 11 determines that the GPS distance data 123 is not received ("NO" at Step S118), the CPU 11 repeats Step S118. If the CPU 11 determines that the GPS distance data 123 is received ("YES" at Step S118), the CPU 11 stops reflecting the acceleration sensor distance to the moving distance and switches the value to be added to the measurement distance data 122 to the GPS distance (Step S119). Step S119 is similar to Step S115. At Step S119, the method for specifying the moving distance is switched from the second method to the first method. After Step S119, the CPU 11 moves the process to Step S106.

If the CPU 11 determines that the command for ending measurement is given at Step S120 ("NO" at Step S120), the CPU 11 resets the measurement values of the elapsed time 31, the moving distance 32, and the average pace 33 to "0" as the reset state, and ends the moving distance specifying process.

In the moving distance specifying process shown in FIG. 6, a notification sound process as follows may be performed in the run state.

Figure 7:
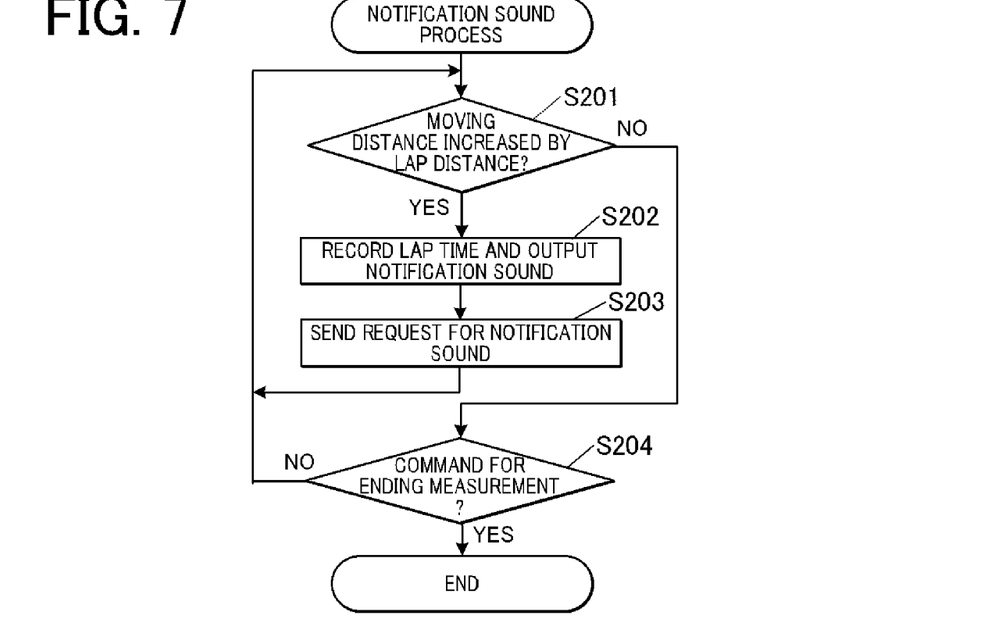
FIG. 7 is a flowchart showing control steps of a sound notification process.

FIG. 7 is a flowchart showing control steps of the notification sound process by the CPU 11.

The notification sound process is performed in the case where measurement is started in the stopwatch mode while the auto-lap function is valid.

In the notification sound process, the CPU 11 determines whether the moving distance indicated by the measurement distance data 122 increases by a predetermined lap distance since a lap time is recorded for the last time (since measurement is started if a lap time is not yet recorded) (Step S201). The lap distance is set in advance by the user, for example. If the CPU 11 determines that the moving distance increases by the lap distance ("YES" at Step S201), the CPU 11 records the lap time in the memory 12 and causes the notification sound output unit 16 to output a predetermined notification sound (Step S202). The CPU 11 transmits a request for a notification sound (notification sound request) to the smartphone 20 (Step S203). The smartphone 20, in response to reception of this notification sound request, outputs the predetermined notification sound from the speaker 28. When Step S203 is ended, the CPU 11 returns the process to Step S201.

At Step S201, if an increase in the moving distance is shorter than the lap distance ("NO" at Step S201), the CPU 11 determines whether a command for ending measurement is given (Step S204). If the CPU 11 determines that the command for ending measurement is not given ("NO" at Step S204), the CPU 11 returns the process to Step S201, and if the command for ending measurement is given ("YES" at Step S204), the CPU 11 ends the notification sound process.

Figure 8:
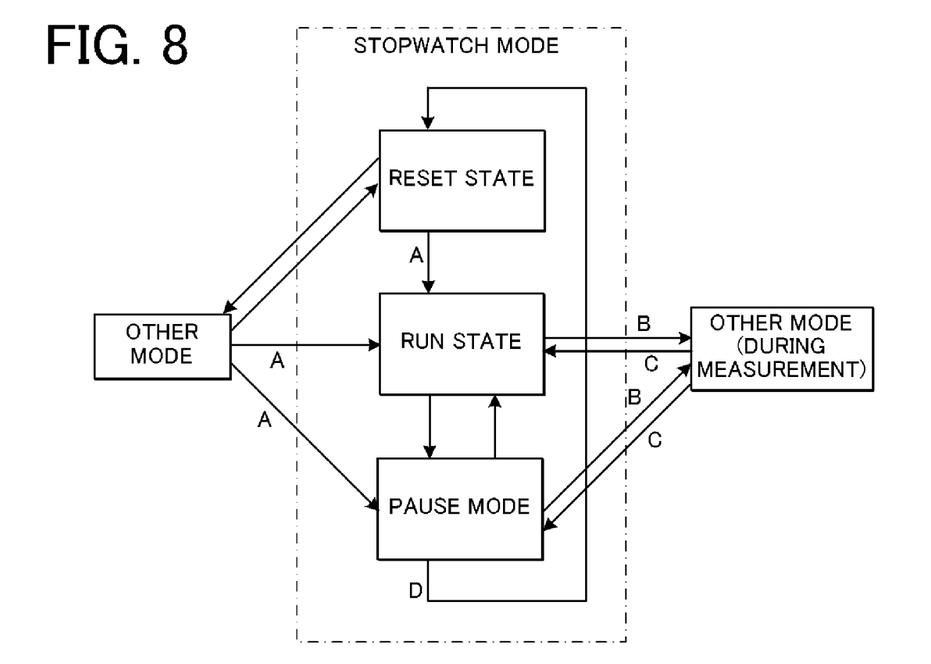
FIG. 8 is an explanatory diagram showing transitions of operation modes.

In the moving distance specifying process shown in FIG. 6, the start or pause of measurement by the start/stop button and the end (reset) of measurement by the reset button are received while the electronic timepiece is operating in the stopwatch mode, but the present disclosure is not limited to this example. That is, as shown in FIG. 8, it may be possible to directly transition to any of the reset state, the run state, or the pause state of the stopwatch mode from any other operation mode. Here, the other operation mode is not limited to the time mode, and may be the recall mode, the alarm mode, or the timer mode described above, and the like. Those other operation modes are the second operation mode in which the frequency of the second wireless communications is greater than the above-described reference frequency.

In FIG. 8, the "other mode" shown on the left side of the stopwatch mode indicates other operation modes in which the elapsed time 31, the moving distance 32, and the average pace 33 are not being measured. The "other mode" shown on the right side of the stopwatch mode indicates other operation modes to which the operation mode is transitioned while the elapsed time 31, the moving distance 32, and the average pace 33 are being measured. The arrows between the modes or the states indicate transitions between the modes or the states.

In FIG. 8, a transition from the other mode to the run state or the pause state before the start of measurement and a transition from the reset state to the run state in the stopwatch mode are defined as a "transition A."

A transition from the run state or the pause state to the other operation mode while measurement is being continued is defined as a "transition B."

A transition from the other operation during measurement to the run state or pause state is defined as a "transition C."

A transition from the pause state to the reset state in the stopwatch mode is defined as a "transition D."

In the transitions A to D, the measurement operations of the GPS distance and the acceleration sensor distance are changed during the transitions.

Figure 9:
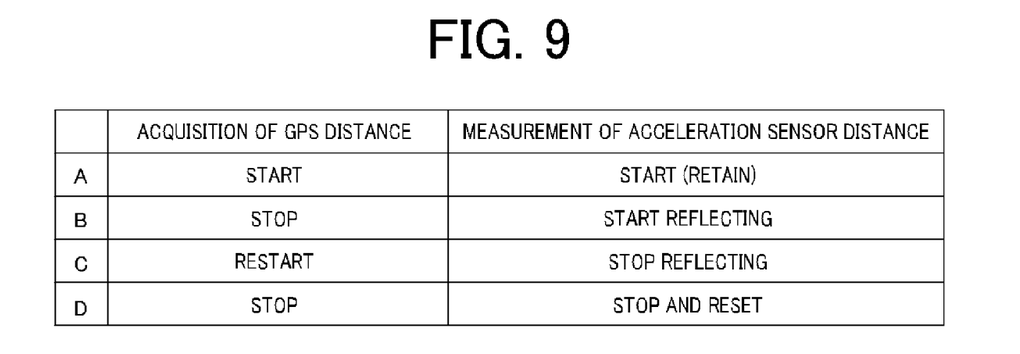
FIG. 9 shows changes of measurement operations in transitions A to D.

FIG. 9 shows changes of the measurement operations in the transitions A to D.

In the transition A, acquisition of the GPS distance (namely, reception of the GPS distance data 123) and reflection of the GPS distance to the moving distance are started, and measurement of the acceleration sensor distance and retention of the acceleration sensor distance in the memory 12 (the acceleration sensor distance 124) are started.

In the transition B, acquisition of the GPS distance is stopped and reflection of the acceleration sensor distance to the moving distance is started. That is, the method for specifying the moving distance is transitioned from the first method using the GPS distance to the second method using the acceleration sensor distance.

In the transition B, acquisition of the GPS distance is restarted and reflection of the acceleration sensor distance to the moving distance is stopped. That is, the method for specifying the moving distance is switched from the second method to the first method.

In the transition D, acquisition of the GPS distance is stopped and measurement of the acceleration sensor distance is stopped and reset. The measured values of the moving distance 32 and the average pace 33 are reset.

Such transitions along with the changes in the measurement operations enable transitions between the states of the stopwatch mode and between the operation modes while stably continuing to specify the moving distance.

In the case where the other operation modes include the first mode in which the frequency of the second wireless communications is equal to or below the reference frequency, it is not necessary to switch the method for specifying the moving distance in the transition between the stopwatch mode and this first operation mode. In other words, it is possible to specify the moving distance by the first method using the GPS distance data 123 in this first operation mode as in the stopwatch mode.

Advantageous Effects

As described hereinbefore, the electronic timepiece 10 as the communication device in this embodiment includes the wireless communication unit (receiver) 17 that performs, with the smartphone 20 as the external device, the first wireless communication for acquiring the GPS distance as the first information concerning the moving distance of the communication device and the second wireless communication that possibly has collision with the first wireless communication and the CPU 11 as the processor, and the CPU 11 specifies the moving distance correlation value related to the moving distance of the electronic timepiece 10. The CPU 11 acquires the acceleration of the electronic timepiece 10, specifies the moving distance correlation value based on the GPS distance that the wireless communication unit 17 acquires from the smartphone 20, and specifies the moving distance correlation value based on the result of detection by the acceleration sensor 18 in a case determining that a first condition is present. In the first condition, acquisition of the GPS distance from the smartphone 20 is possibly interrupted by the collision more than predetermined.

As a result of this, if the GPS distance can be continuously acquired, it is possible to specify the moving distance correlation value by the first method using the GPS distance and if acquisition of the GPS distance may be interrupted more than predetermined, it is possible to continue specifying the moving distance correlation value by the second method using the acceleration sensor distance. Therefore, it is possible to stably specify the moving distance correlation value at appropriate timings regardless of the state of the wireless communication with the smartphone 20. Further, it is possible to make it less likely for a problem of delayed update of display of the moving distance correlation value to occur, enhancing the user convenience.

In a conventional communication device, acquisition of the distance information may be delayed due to collision of wireless communications when transmission and reception of various kinds of information to and from an external device are congested. In that case, the communication device can acquire the moving distance and the moving distance correlation value cannot be specified at appropriate timings, problematically. On contrary, in the electronic timepiece according to the present embodiment, it is possible to stably specify the moving distance correlation value at appropriate timings.

The CPU 11 switches the operation mode of the electronic timepiece 10 between the stopwatch mode and the time mode. In the stopwatch mode, a frequency of the second wireless communication is equal to or below a predetermined reference frequency. In the time mode, a frequency of the second wireless communication is greater than the predetermined reference frequency. The CPU 11 determines that the first state is present when the electronic timepiece 10 is operating in the time mode.

This makes it possible to switch the specifying method by which the moving distance correlation value can be stably specified under an easy control triggered by the switching of the operation modes. Even in the operation mode where the second wireless communication that may collide with the first wireless communication may be established, it is possible to continue specifying the moving distance correlation value by the first method if the frequency of the collision is equal to or below the reference frequency. Therefore, it is possible to improve the accuracy of specifying the moving distance correlation value while preventing occurrence of the problem of delayed update of display of the moving distance correlation value.

The reference frequency is once for each time the moving distance of the electronic timepiece 10 increases by a predetermined amount.

As the reference frequency is set this way, the number of times of failure of acquisition of the GPS distance for each time the electronic timepiece 10 moves by a predetermined distance can be suppressed not to be more than once. Therefore, it is possible that acquisition of the GPS distance is not continuously interrupted over a long moving distance. Further, this makes it possible to accurately specify the moving distance correlation value by the first method even if the second wireless communication is established for a notification sound linkage at the time of auto-lap record, for example.

The CPU 11 switches the operation mode of the electronic timepiece 10 between the stopwatch mode and the time mode, and determines that the first condition is present when the electronic timepiece 10 is operating in the time mode. Here, in the stopwatch mode as the first operation mode, the second wireless communication is not established, and in the time mode as the second operation mode, the second wireless communication is established.

This makes it possible to switch the specifying method by which the moving distance correlation value can be stably specified under an easy control triggered by the switching of the operation modes. As the first method is used only in the operation mode in which the second wireless communication is established, it is possible to suppress occurrence of the problem of delayed update of display of the moving distance correlation value.

The electronic timepiece 10 includes the time measurement circuit 153 that counts date and time. The CPU 11 modifies the date and time counted by the time measurement circuit 153 based on the date-and-time information (the second information) that the wireless communication unit 17 acquires from the smartphone 20. Here, the wireless communication unit 17 acquires the date-and-time information by the second wireless communication.

This makes it possible to stably specify the moving distance correlation value at appropriate timings even if the first wireless communication for acquiring the GPS distance collides with the second wireless communication for acquiring the date-and-time information.

The first operation mode is the time mode in which an elapsed time is measured and displayed This makes it possible to continue specifying the moving distance correlation value while switching the operation mode to the time mode even if acquisition of the GPS distance is interrupted more than predetermined in the time mode.

In a case determining that the second condition in which acquisition of the GPS distance is interrupted is present, the CPU 11 specifies the moving distance correlation value based on the detection result by the acceleration sensor 18.

This makes it possible to continue specifying the moving distance correlation value by switching to the second method if acquisition of the GPS distance is interrupted more than predetermined. Further, it is stably specify the moving distance correlation value even if positioning by the smartphone 20 is not appropriately performed or an error occurs in short-distance wireless communication between the smartphone 20 and the electronic timepiece 10.

In response to a predetermined time interval in acquisition of the GPS distance from the smartphone 20, the CPU 11 determines that the second condition is present This makes it possible to appropriately switch the method to the second method by an easy determination method.

The method for specifying the moving distance correlation value in the above-described embodiment is the method for specifying the moving distance correlation value related to the moving distance of the electronic timepiece 10 as the communication device. The method for specifying the moving distance correlation value includes acquiring the acceleration of the electronic timepiece 10, specifying the moving distance correlation value based on the GPS distance as the first information that the wireless communication unit 17 acquires from the smartphone 20, and specifying the moving distance correlation value based on the result of detection by the acceleration sensor 18 in a case determining that a first condition is present. In the first condition, acquisition of the GPS distance from the smartphone 20 is possibly interrupted by the collision more than predetermined.

This makes it possible to stably specify the moving distance correlation value at appropriate timings. Further, it is possible to make it less likely for a problem of delayed update of display of the moving distance correlation value to occur, enhancing the user convenience.

The memory 12 as a non-transitory storage medium stores the program 121 executable by the CPU 11 as the processor installed on the electronic timepiece 10 as the communication device. The program 121 causes the CPU 11 to acquire the acceleration of the electronic timepiece 10, specify the moving distance correlation value based on the GPS distance as the first information that the wireless communication unit 17 acquires from the smartphone 20, and specify the moving distance correlation value based on the detection result of the acceleration sensor 18 in a case determining that a first condition is present. In the first condition, acquisition of the GPS distance from the smartphone 20 is possibly interrupted by the collision more than predetermined.

As the electronic timepiece 10 operates according to this program 121, it is possible to stably specify the moving distance correlation value at appropriate timings. Further, it is possible to make it less likely for a problem of delayed update of display of the moving distance correlation value to occur, enhancing the user convenience.

(Misc.)

The above embodiment is merely one of preferred examples of the communication device, the method for specifying the moving distance, and the storage medium of the present disclosure, and is not intended to limit the present disclosure.

For example, the electronic timepiece 10 performs digital display in a form of dot matrix, but is not limited to this example. An analog electronic timepiece that displays at least part of information on time, elapsed time, moving distance, and the like.

The communication device is not limited to the electronic timepiece 10, and may be any device that is carried around and used by the user, such as a tablet terminal, a laptop, a wearable device that the user puts on the body.

The smartphone 20 is used as an example of the external device, but the present disclosure is not limited to this. A terminal device such as a tablet terminal or a laptop may be used as the external device.

In the above-described embodiment, the CPU 21 of the smartphone 20 calculates the GPS distance from the positional information and the electronic timepiece 10 receives the GPS distance data 123 including that GPS distance, but the present disclosure is not limited to this example. For example, the electronic timepiece 10 may acquire the positional information from the smartphone 20, and the CPU 11 of the electronic timepiece 10 may calculate the GPS distance (the moving distance correlation value) from the transition of the acquired positional information. Calculating the moving distance correlation value from the positional information in this way is also a form of "specifying the moving distance correlation value."

In the above-described embodiment, whether the first condition is present or not is determined based on the operation mode in which the electronic timepiece 10 is operating, but the present disclosure is not limited to this example. For example, in any one of the operation modes, the first method is first used to specify the moving distance, and in response to detection of a failure of acquisition of the GPS distance due to collision of the wireless communications, the CPU 11 may determine that the first condition is present and switch the method for specifying the moving distance to the second method without changing the above-described operation mode.

The first method and the second method may be switched to each other based on the result of detection of whether the first condition is present, and the result of detection of whether the second condition is present or not may not be used. In that case, Steps S116 to S119 in the moving distance specifying process in FIG. 6 may be omitted.

The reference frequency is once for each time the moving distance of the electronic timepiece 10 increases by a predetermined reference distance (ex., lap distance), but the present disclosure is not limited to this example. The reference frequency may be the average number of times the second wireless communication is established per unit of time, or the average number of times the second wireless communication is established per unit of moving distance.

In the above description, as a computer readable medium storing the programs of the present invention, the non-volatile memory of the memory 12 is used, but the present disclosure is not limited to this example. The computer readable medium may be an information recording/storage medium such as an HDD, an SSD, a flash memory, and a CD-ROM. Further, as a medium to provide data of the programs of the present invention via a communication line, a carrier wave can be used.

Further, needless to say, the detailed configurations and detailed operations of the components of the electronic timepiece 10 as the communication device and the smartphone 20 as the external device in the above embodiment can be appropriately modified without departing from the scope of the present invention.

In the above, one or more embodiments of the present invention are described. However, the scope of the present invention is not limited thereto. The scope of the present invention includes the scope of claims below and the scope of their equivalents.

What is claimed is:

1. A communication device comprising:
a wireless communication receiver that performs, with an external device, a first wireless communication for acquiring first information concerning a moving distance of the communication device and a second wireless communication that possibly has collision with the first wireless communication; and
a processor that specifies a moving distance correlation value related to the moving distance, wherein the processor is configured to:
acquire an acceleration of the communication device;
specify the moving distance correlation value based on the first information that the wireless communication receiver acquires from the external device;
switch an operation mode of the communication device between a first operation mode and a second operation mode,
wherein in the first operation mode, a frequency of the second wireless communication is equal to or below a predetermined reference frequency, and
wherein in the second operation mode, a frequency of the second wireless communication is greater than the predetermined reference frequency; and
specify the moving distance correlation value based on the acceleration of the communication device when the communication device is operating in the second operation mode.

2. The communication device according to claim 1, wherein the reference frequency is once for each time the moving distance of the communication device increases by a predetermined amount.

3. The communication device according to claim 2, further comprising:
a time measurer configured to count date and time,
wherein the processor is configured to modify the date and time counted by the time measurer based on second information on date and time that the wireless communication receiver acquires from the external device, and
wherein the wireless communication receiver is configured to acquire the second information by the second wireless communication.

4. The communication device according to claim 2, wherein in the first operation mode, an elapsed time is measured and displayed.

5. The communication device according to claim 1, wherein the first operation mode is a mode in which the second wireless communication is not established, and
wherein the second operation mode is a mode in which the second wireless communication is established.

6. The communication device according to claim 5, further comprising:
a time measurer configured to count date and time,
wherein the processor is configured to modify the date and time counted by the time measurer based on second information on date and time that the wireless communication receiver acquires from the external device, and
wherein the wireless communication receiver is configured to acquire the second information by the second wireless communication.

7. The communication device according to claim 5, wherein in the first operation mode, an elapsed time is measured and displayed.

8. The communication device according to claim 5, wherein in a case determining that a second condition in which acquisition of the first information is interrupted is present, the processor is configured to specify the moving distance correlation value based on a detection result by the acceleration sensor.

9. The communication device according to claim 1, further comprising:
a time measurer configured to count date and time,
wherein the processor is configured to modify the date and time counted by the time measurer based on second information on date and time that the wireless communication receiver acquires from the external device, and
wherein the wireless communication receiver is configured to acquire the second information by the second wireless communication.

10. The communication device according to claim 9, wherein in the first operation mode, an elapsed time is measured and displayed.

11. The communication device according to claim 9, wherein in a case determining that a second condition in which acquisition of the first information is interrupted is present, the processor is configured to specify the moving distance correlation value based on a detection result by the acceleration sensor.

12. The communication device according to claim 1, wherein in the first operation mode, an elapsed time is measured and displayed.

13. The communication device according to claim 12, wherein in a case determining that a second condition in which acquisition of the first information is interrupted is present, the processor is configured to specify specifies the moving distance correlation value based on a detection result by the acceleration sensor.

14. The communication device according to claim 1, wherein in a case determining that a second condition in which acquisition of the first information is interrupted is present, the processor is configured to specify the moving distance correlation value based on a detection result by the acceleration sensor.

15. The communication device according to claim 14, wherein in response to a predetermined time interval in acquisition of the first information from the external device, the processor is configured to determine that the second condition is present.

16. The communication device according to claim 1, wherein in a case determining that a second condition in which acquisition of the first information is interrupted is present, the processor is configured to specify the moving distance correlation value based on a detection result by the acceleration sensor.

17. The communication device according to claim 16, wherein in response to a predetermined time interval in acquisition of the first information from the external device, the processor is configured to determine that the second condition is present.

18. The communication device according to claim 1, wherein the processor is configured to transmit, to the external device, a signal to stop transmission of the first information to the communication device in a case switching the operation mode of the communication device from the first operation mode to the second operation mode.

19. A method for specifying a moving distance correlation value related to a moving distance of a communication device,
wherein the communication device comprises:
a wireless communication receiver that performs, with an external device, a first wireless communication for acquiring first information concerning the moving distance of the communication device and a second wireless communication that possibly has collision with the first wireless communication,
wherein the method comprises:
acquiring an acceleration of the communication device;
specifying the moving distance correlation value based on the first information that the wireless communication receiver acquires from the external device;
switch an operation mode of the communication device between a first operation mode and a second operation mode,
wherein in the first operation mode, a frequency of the second wireless communication is equal to or below a predetermined reference frequency, and
wherein in the second operation mode, a frequency of the second wireless communication is greater than the predetermined reference frequency; and
specifying the moving distance correlation value based on the acceleration of the communication device when the communication device is operating in the second operation mode.

20. A non-transitory storage medium storing a program executable by a processor installed on a communication device comprising a wireless communication receiver that performs, with an external device, a first wireless communication for acquiring first information concerning a moving distance of the communication device and a second wireless communication that possibly has collision with the first wireless communication,
the program causes the processor to:
acquire an acceleration of the communication device;
specify a moving distance correlation value related to the moving distance based on the first information that the wireless communication receiver acquires from the external device;
switch an operation mode of the communication device between a first operation mode and a second operation mode,
wherein in the first operation mode, a frequency of the second wireless communication is equal to or below a predetermined reference frequency, and
wherein in the second operation mode, a frequency of the second wireless communication is greater than the predetermined reference frequency; and
specify the moving distance correlation value based on the acceleration of the communication device when the communication device is operated in the second operation mode.

* * * * *